March 30, 1937.    G. B. SCHEIBELL    2,075,770
FILM AND RECORDING SYSTEM THEREFOR
Filed March 12, 1931    2 Sheets-Sheet 1
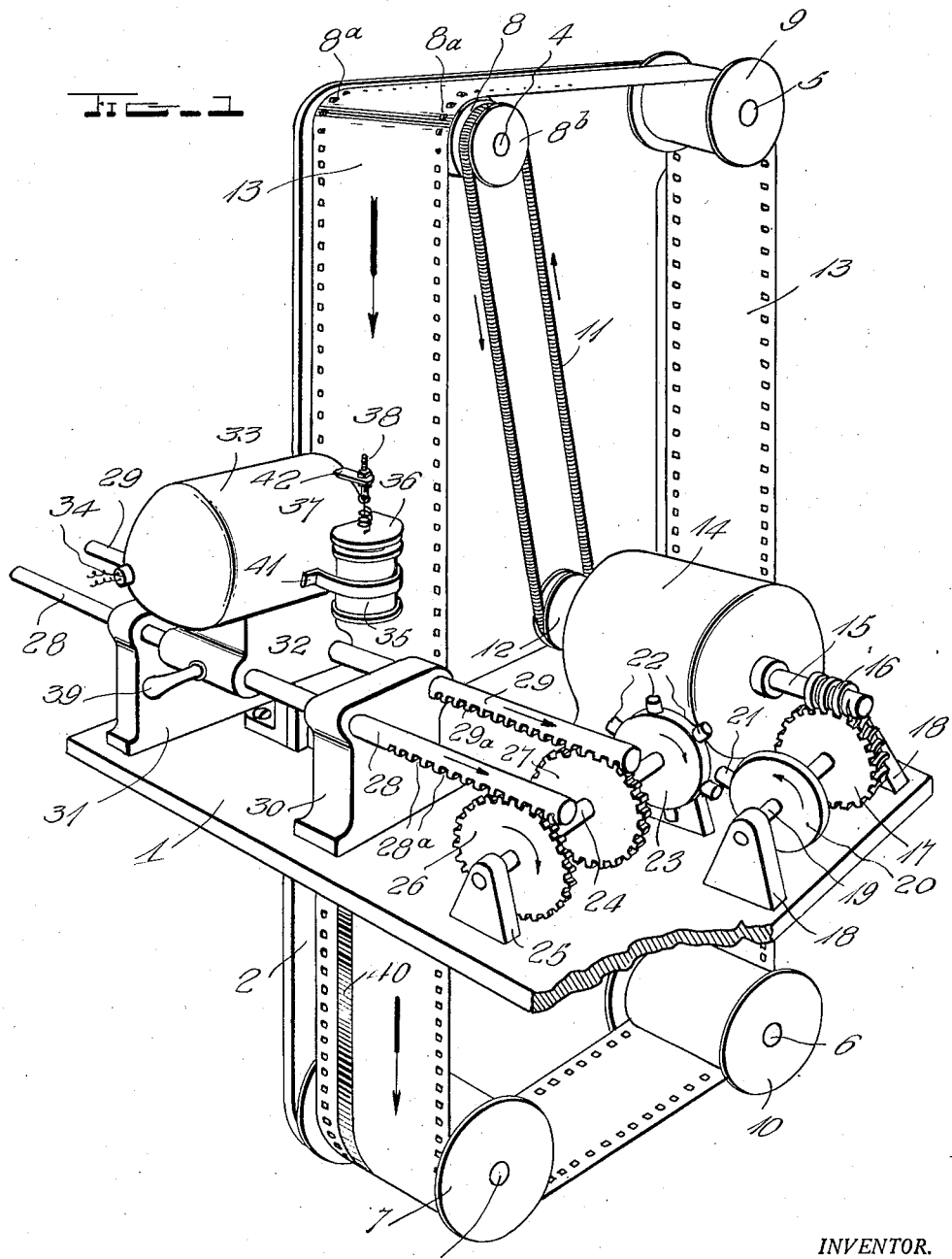
INVENTOR.
Gordon B. Scheibell,
BY John B. Brady
ATTORNEY.

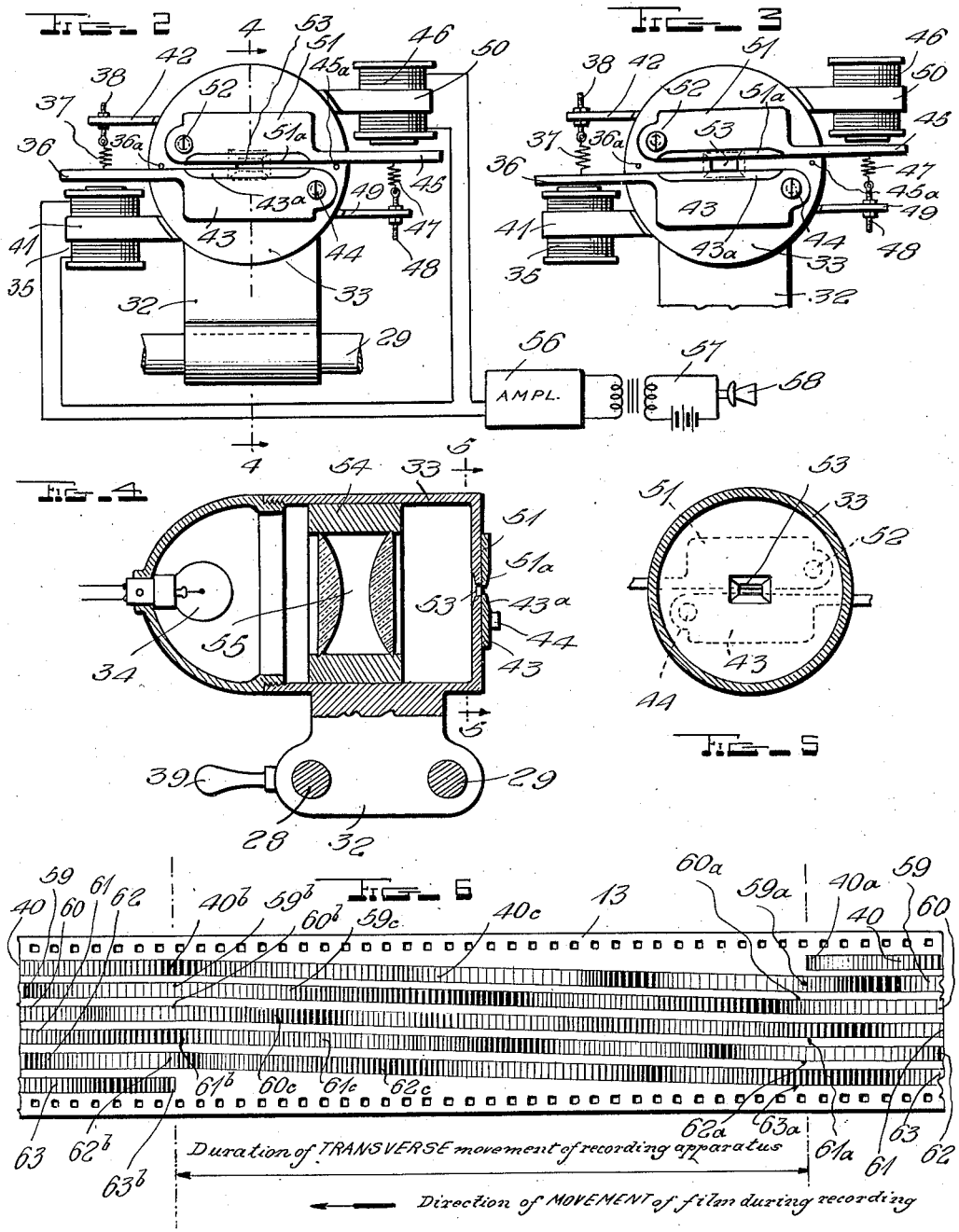

Patented Mar. 30, 1937

2,075,770

UNITED STATES PATENT OFFICE 2,075,770

FILM AND RECORDING SYSTEM THEREFOR

Gordon Brown Scheibell, Newark, N. J., assignor to Radio Corporation of America, New York, N. Y., a corporation of Delaware Application March 12, 1931, Serial No. 522,095

10 Claims. (Cl. 179—100.3)

My invention relates broadly to sound recording apparatus and more particularly to the arrangement of a sound film and a method of recording sound on film.

One of the objects of my invention is to provide an arrangement of sound film having a multiplicity of sound channels recorded thereon with continuous connecting channels intermediate the ends of the sound channels on the film.

Another object of my invention is to provide a construction of sound film having a multiplicity of sound channels recorded thereon in longitudinal tracks with adjacent sound tracks interconnected end to end by angularly extending sound tracks, thereby providing a continuous sound record from the initial position adjacent one edge of the film to a terminating position adjacent the opposite edge of the film.

Still another object of my invention is to provide a method of reproducing sound from film bearing a sound record in a multiplicity of parallel channels which consists in moving a film in the form of a band longitudinally throughout the major portion of its length and longitudinally and transversely throughout a small portion of its length for establishing a continuous sound track around the film band.

A further object of my invention is to provide an apparatus adapted to move a film band continuously past a transversely shiftable variable light source for recording a continuous sound track on the film.

A still further object of my invention is to provide a construction of automatic sound recording mechanism utilizing a continuous film band which is continuously movable adjacent a variable light source, the variable light source being mounted for step by step transverse movement in timed relation to the movement of the film band whereby a continuous sound track may be recorded on the film in parallel channels.

Another object of my invention is to provide an arrangement for mounting a variable light source adjacent a continuously movable film band where the variable light source is shifted transversely of the film at the end of each complete revolution of the film.

Other and further objects of my invention reside in the construction of sound recording apparatus and arrangement of sound film therefor as set forth more fully in the specification hereinafter following by reference to the accompanying drawings, in which:

Figure 1 is a perspective view illustrating the sound recording apparatus of my invention; Fig. 2 is an elevational view showing the shutter control mechanism for subjecting the light sensitive film to variable light for effecting a recording operation; Fig. 3 is a view similar to Fig. 2 illustrating the shutters open for the passage of a maximum intensity of light to the film under control of the sound variation circuit; Fig. 4 is a longitudinal cross-sectional view taken through the sound recording lamp housing and shutter mechanism; Fig. 5 is a transverse sectional view through the lamp housing on line 5—5 of Fig. 4; and Fig. 6 illustrates a fragmentary section of the sound film and the manner of recording a continuous sound track thereon.

Referring to the drawings in detail, reference character 1 designates a horizontally extending support on which there is erected the vertically extending plate member 2 which carries the laterally projecting spindles 3, 4, 5 and 6 upon which the sprocket 8 and reels 7, 9 and 10 are mounted. The sprocket 8 is provided with sprocket teeth 8a which engage apertures adjacent the edges of the continuous film band 13 for positively driving the film band in a continuous path around the sprocket 8 and reels 7, 9 and 10. A belt 11 engages a driven pulley 8b connected with sprocket 8 and driven from the driving pulley 12 of the driving motor 14. Driving motor 14 has shaft 15 projecting therefrom which carries the worm 16 meshing with the helical gear 17 mounted upon shaft 19 which is journaled upon supports 18 erected upon the horizontally extending plate 1. The shaft 19 carries a disc 20 having a laterally projecting tooth 21. The disc 20 is rotated in the direction of the arrow indicated thereon. The laterally projecting tooth 21 is adapted to abut against the laterally projecting studs 22 carried by the disc 23 mounted upon rotatable shaft 24 which is journaled in the supports 25 on the horizontally extending base 1. The rotatable shaft 24 carries two gears represented at 26 and 27, which gears mesh with teeth 28a and 29a in horizontally movable racks 28 and 29. The racks 28 and 29 are reciprocative through the vertically erected supports 30 and 31 carried by the plate 1. Fastened to the rack members 28 and 29 in a position between the vertically erected members 30 and 31, I provide a carriage 32 which supports a lamp housing 33. A recording lamp 34 is supported in the lamp housing 33 as shown more clearly in Fig. 4. The front of the lamp housing is provided with a light aperture 53 which is normally closed by shutters 51 and 43 as shown more clearly in Figs. 2 and 3. The shutter 51 is pivoted at 52 and has an extension 45 thereon constituting an armature which is variably controlled by electromagnet 46 supported from the lamp housing by suitable bracket 50 as shown. The armature 45 is normally maintained in a position resting against the limiting abutment 45a by means of spring 47 and tension screw 48 secured in the bracket 49 attached to the lamp housing. A similar arrangement is provided for shutter 43. That is, shutter 43 is pivoted at 44 and has an extension 36 thereon forming an armature which is acted upon by the electromagnet 35, the electromagnet 35 being supported by bracket 41 extending from the opposite side of the lamp housing 33.

Armature 36 is normally maintained in contacting engagement with stop 36a under the tension of spring 37 and adjusting screw 38, the adjusting screw being supported in bracket 42 projecting from the lamp housing 33. It will be observed that the shutters 51 and 43 extend laterally across the light aperture 53 and each is beveled as indicated at 51a and 43a to provide accurately aligned edges adapted to provide a light slit in front of the aperture 53 for variably passing light rays from the recording lamp 34 to the film 13 according to the operation of magnets 35 and 46 under control of the microphone 58 in circuit 57 through amplifier 56, that is as the amplitude of the voice frequency energy increases, the solenoids 35 and 46 are each energized to produce maximum pull upon armatures 36 and 45, thereby opening the shutters 51 and 43 by movement of the shutters around pivots 52 and 44 and widening the slit between the blades 51a and 43a for increasing the exposure of the film to light from the recording lamp 34. The lamp housing includes a lens carrier 54 having lenses 55 mounted therein adapted to transmit the light in parallel rays through the light aperture 53 in variable amounts upon the film according to the movement of the shutters. The carriage 32 is automatically shifted in a transverse direction upon each revolution of the continuous film band 13.

In explaining the mechanism for effecting the transverse movement, the arrangement of the film should first be understood. A fragmentary portion of film is shown in Fig. 6 containing the continuous sound channel in parallel extending tracks represented at 40, 59, 60, 61, 62 and 63. The commencement of the sound track is shown at 40a and the termination of the sound track is illustrated at 63a. It will be observed that the sound track 40 extends from a position 40a continuously around the film to the position 40b where the sound track departs from parallelism on the film 13 and extends along an angularly disposed track 40c to the commencement of the sound track 59 indicated at 59a. Sound track 59 extends parallel to sound track 40 continuously around the film to the position 59b, whereupon the sound track 59 continues in a path 59c both transversely and longitudinally of the film to the position 60a. The track 59c is parallel to the track 40c. The sound track 60 commences at 60a and travels continuously around the continuous film band parallel to the sound track 59 terminating at 60b where the sound track extends angularly with respect to the longitudinal axes of the film as represented by the track 60c parallel to the track 59c to a position 61a where the longitudinally extending sound track 61 commences. The parallel portion of sound track 61 terminates at 61b from which position the sound track extends angularly of the film along the channel 61c parallel to the channel 60c to the position 62a. The sound track 62 runs in parallel relation to sound tracks 40, 59, 60 and 61 commencing at the point 62a and extends continuously around the film in strict parallelism to the position 62b. At this position the sound track extends angularly along channel 62c to the position 63a parallel to the angularly disposed sound track 61c. The sound track 63 commencing at 63a extends parallel continuously around the film terminating at 63b as shown. It will therefore be seen that the sound record is not in any sense a spiral or a helix but is a continuous record formed by a multiplicity of parallel channels which extend parallel even through the transverse angular portion of the sound record.

The lamp housing 33 is moved in step by step relation transversely of the film upon each complete revolution of the film. That is, the projecting pin 21 is adapted to engage any one of the projecting pins 22 on disc 23 and advances disc 23 an angular distance equal to the distance between centers of the sound channels. The time of this movement is such that the transverse movement tends to occur just prior to the approach of the end of one sound channel to the commencement thereof. That is to say, the recording lamp is maintained stationary while the film band is being moved until the film band approaches the end of a complete revolution, whereupon transverse motion is imparted to the recording lamp housing 33, which motion continues throughout the time period that projecting pin 21 is abutting against any one of the projecting pins 22. After projecting pin 21 passes beyond a selected projecting pin and is free thereof the lamp housing 33 is maintained in fixed position while the continuous film band 13 is moved through a substantially complete revolution. This process is repeated for each of the sound channels until the last sound channel is reached and the recording on the film complete. Thereupon the film band is removed from the recording machine and developed and printed to form a film positive, identical to the sound film thus recorded.

The recording apparatus is now ready for a complete rerun and the recording head or carriage 32 is shifted back to the original position by grasping handle 39 and shifting the carriage transversely to the position at which the recording process commences. It will be understood that the record which I have indicated on the film at 40 in Fig. 1 and the record shown in Fig. 6 will only appear thereon after the film has been developed and printed and the records I have illustrated have been shown only for the purpose of explaining the principles of my invention.

The worm gear 16 and helical gear 17 are of an appropriate size to provide the proper timed relation between the operation of the driving belt 11 for moving the endless film band 13 while shifting the carriage 32 depending upon the periodic abutment of projecting pin 21 with studs 22. The carriage 32 is periodically or intermittently moved transversely with respect to the longitudinally moving film to expose successive portions of the film to the effect of variable light rays. It should be understood however that the film may be shifted transversely during the continuous longitudinal movement thereof while the recording lamp is maintained stationary utilizing the same principles which I have set forth herein. In reproducing the sound from the film which I have described, a translating mechanism timed and operated in a manner similar to the recording apparatus herein described is utilized.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. An apparatus for recording sound on film comprising, a continuous photosensitive film band, a driving system for moving said film band continuously in one direction, a recording head disposed adjacent said continuous film band for directing a narrow beam of light on a restricted longitudinal portion thereof, and an intermittent motion mechanism driven by said driving means for moving said recording head transversely of said film at approximately the end of each complete revolution of said continuous film band whereby said beam of light is directed upon an adjacent longitudinal portion of said film during a succeeding revolution of said film band.

2. An apparatus for recording sound on film comprising, a continuous photosensitive film band, a sound recording head for directing a narrow beam of light on a restricted longitudinal portion of said film, driving means for longitudinally moving said film whereby said beam of light produces a sound record thereon extending longitudinally of said film substantially parallel to the edges thereof, and an intermittent motion mechanism connected with said driving means for causing the relative transverse movement of said sound head and said film at substantially the end of one revolution of said film whereby said light beam is directed upon said film to produce an adjacent longitudinal record coextensive of said first longitudinal record, the recording action of said light beam being uninterrupted during said transverse movement.

3. An apparatus for recording sound on film comprising, a supporting structure, a film, sprocket means mounted in said structure for longitudinally moving said film, a motor for driving said sprocket means, a sound head for directing a narrow beam of light upon said film, a carriage for said sound head including a rack and pinion whereby said sound head can be moved transversely with respect to said film, and a mechanical coupling between said motor and said pinion for automatically effecting the movement of said carriage by said motor while said film is being fed in one longitudinal direction by said motor.

4. A film apparatus comprising a supporting structure, a continuous photosensitive film band, sprocket means mounted in said supporting structure for longitudinally moving said film band, a motor for driving said sprocket means, a sound head for directing a narrow beam of light upon a restricted portion of said film for producing a longitudinal record thereon substantially parallel with the edges thereof, a supporting carriage for said sound head including toothed rods, gear wheels for engaging with said toothed rods, and an intermittent motion mechanism interconnecting said gear wheels and said motor whereby said sound head is moved a step transversely of said film at substantially the completion of each revolution of said film for directing said beam of light on an adjacent longitudinal portion thereof.

5. A film apparatus comprising, a film band, motor driven means for longitudinally moving said film band, optical means for directing a beam of light on said film band, said beam of light being substantially less in width than the width of said film, and a motor driven intermittent motion mechanism for automatically causing the relative transverse movement of said optical means and said film at predetermined times with respect to the longitudinal movement of said film in one direction whereby said beam of light is directed to different longitudinal portions of said film while said film is moved in one longitudinal direction.

6. A recording system comprising, a photosensitive surface, means for continuously moving said photosensitive surface at a uniform rate of speed in a recording process, mechanical means for producing a discontinuous intermittent mechanical motion, and means for directing light to said continuously moved photosensitive surface, said light directing means being moved in accordance with the movement of said mechanical means for producing a continuous record on said photosensitive surface displaced thereon in accordance with said discontinuous intermittent motion.

7. Recording apparatus comprising, a photosensitive surface, means for moving said surface, means for directing light to said surface to make a continuous record thereon, and means for imparting a predetermined discontinuous motion to said last mentioned means to produce an intermittently displaced but continuous record on said surface.

8. Film apparatus comprising, a photosensitive film, means for longitudinally moving said film, means for directing light to said film to produce a longitudinal record thereon, and means for continuously moving said film in one longitudinal direction and intermittently moving said light directing means transversely of said film.

9. The method of producing a photographic record comprising, producing the uniform movement of a photosensitive film in one longitudinal direction, directing light to a restricted longitudinal portion of said film to make a photographic record thereon, and intermittently causing light to be directed to a different longitudinal portion of said film during said uniform movement of said film.

10. The method of recording sound tracks on a photosensitive film comprising, moving a photosensitive film at a uniform rate of speed in one longitudinal direction, directing variable light upon a restricted longitudinal portion of said film to make a sound record thereon substantially parallel to the edges of said film, and directing light to another longitudinal portion of said film to make a sound record thereon substantially parallel to said first record but displaced therefrom on said film.

GORDON BROWN SCHEIBELL.